(12) United States Patent
Yamaguchi

(10) Patent No.: US 6,643,229 B1
(45) Date of Patent: Nov. 4, 2003

(54) OPTICAL PICKUP APPARATUS OF TILT CONTROL TYPE

(75) Inventor: Hideo Yamaguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/493,007

(22) Filed: Jan. 28, 2000

(30) Foreign Application Priority Data

Jan. 29, 1999 (JP) .......................................... 11-021855

(51) Int. Cl.⁷ ................................................ G11B 7/08
(52) U.S. Cl. ................................. 369/44.11; 369/53.19
(58) Field of Search ........................... 369/44.11, 44.15, 369/44.32, 44.14, 44.16, 53.19

(56) References Cited

U.S. PATENT DOCUMENTS

| | | | | |
|---|---|---|---|---|
| 5,043,964 A | * | 8/1991 | Suzuki ........................ 369/215 |
| 5,430,699 A | * | 7/1995 | Matsubara et al. ...... 369/44.32 |
| 5,905,255 A | * | 5/1999 | Wakabayashi et al. ... 250/201.5 |
| 6,084,834 A | * | 7/2000 | Kawano et al. .......... 369/44.14 |
| 6,181,670 B1 | * | 1/2001 | Nagasato ................... 369/244 |
| 6,341,104 B1 | | 1/2002 | Yamaguchi et al. |

FOREIGN PATENT DOCUMENTS

| | | |
|---|---|---|
| JP | 10031829 | 2/1998 |
| JP | 10116428 | 5/1998 |
| JP | 10320804 | 12/1998 |

* cited by examiner

Primary Examiner—Carl Whitehead, Jr.
Assistant Examiner—Jennifer M Dolan
(74) Attorney, Agent, or Firm—Stevens, Davis, Miller & Mosher, LLP

(57) ABSTRACT

There is disclosed an optical pickup apparatus in which an optical axis of an objective lens can be kept perpendicular to a recording surface of an optical disk regardless of a warp or a curvature of the optical disk. In this optical pickup apparatus, a lens holder can be moved in a focusing direction and a tracking direction. In order that the objective lens can be tilted in accordance with a skew of the optical disk in a radial direction, second magnets are mounted on the lens holder whereas second coils are mounted in opposed relation to the second magnets, respectively. The second magnets and the second coils cooperate with each other to tilt the objective lens.

7 Claims, 11 Drawing Sheets

OPTICAL PICKUP APPARATUS OF TILT CONTROL TYPE

BACKGROUND OF THE INVENTION

1. Field of the Invention

This invention relates to an optical pickup apparatus used in an optical disk apparatus so as to record and reproduce information relative to an optical disk medium such as a high-density disk and a compact disk. More specifically, the invention relates to an optical pickup apparatus in which an optical axis of an objective lens can be kept perpendicular to a recording surface of the optical disk.

2. Description of the Related Art

A conventional optical pickup apparatus will now be described with reference to FIG. 10. FIG. 10 is a perspective view of the conventional optical pickup apparatus, and FIGS. 11 to 14 are views explanatory of a skew of an objective lens developing when a conventional actuator device moves in a focusing direction and a tracking direction. More specifically, FIG. 11 is an enlarged view of a magnetic circuit portion, FIG. 12 is a cross-sectional view taken along the line A—A of FIG. 11, showing a tracking operation, FIG. 13 is a cross-sectional view taken along the line A—A of FIG. 11, showing a focusing-tracking operation, and FIG. 14 is a view explanatory of a skew of the pickup apparatus of FIG. 10 shown in FIG. 13.

As shown in FIG. 10, the conventional optical pickup apparatus comprises an objective lens 1 for converging light onto an optical disk, a lens holder 2 to which the objective lens 1 is secured by an adhesive or the like, a focusing coil 3 adhesively secured to the lens holder 2 so as to move the lens holder 2 in a focusing direction, tracking coils 4 adhesively secured to the lens holder 2 so as to move the lens holder 2 in a tracking direction, four wires 5 which serve to feed electric current to the focusing coil 3 and the tracking coils 4, and hold the lens holder 2 in a neutral position, relay boards 6 secured to the lens holder 2 by an adhesive or the like so as to relay the feeding of electric current to the focusing coil 3 and the tracking coils 4 from the wires 5, a suspension base 7 to which the four wires 5, holding the lens holder 2 in the neutral position, are fixedly secured, a yoke 9 fixedly secured to the suspension base 7 by an adhesive or screws, and magnets 8 fixedly secured to the yoke 9 by an adhesive or the like so as to impart a magnetic field to the focusing coil 3 and the tracking coils 4.

After an optical axis of the objective lens 1 is adjusted, the pickup apparatus of this construction is precisely fixedly secured to a carriage (not shown) by an adhesive or solder. By changing the magnitude and direction of electric current flowing through the focusing coil 3 and the tracking coils 4, the lens holder 2, holding the focusing coil 3 and the tracking coils 4, can be moved in a focusing direction and a tracking direction in accordance with Fleming's left-hand rule.

With the above conventional actuator device, the lens holder 2 can be moved only in the two directions (i.e., the focusing direction and the tracking direction), and therefore when reading and writing information relative to an optical disk having a tilt, a skew angle (i.e., an angle between the optical axis and a line perpendicular to the disk surface) develops, which has resulted in a problem that the reading and writing become unstable.

Next, the focusing-tracking operation of the conventional pickup apparatus will be described. The behavior of the lens holder 2 will now be described with reference to FIG. 11D which is a cross-sectional view taken along the line A—A of FIG. 11A, showing the magnetic circuit and the focusing and tracking coils of FIG. 10. In FIGS. 12A, 12B, 13A and 13B, the showing of the lens-holder 2 is omitted since the behavior of the lens holder 2 can be shown by the focusing coil 3 and the tracking coils 4.

In FIG. 12A, the behavior of the lens holder 2 will be described, assuming that the direction of a magnetic field, formed by the magnets 8 and the yoke 9, is a direction from the front side of the sheet of the FIG. 12A to the rear side thereof. As shown in FIG. 12A, the direction of upward and downward movement of the lens holder 2 is the focusing direction whereas the direction of right and left movement of the lens holder 2 is the tracking direction. When electric current is flowed in the tracking coils 4 in directions of arrows (FIG. 12B), the lens holder 2 is moved left according to Fleming's left-hand rule. Then, in this condition of FIG. 12B, when electric current is flowed in the focusing coil 3 in a direction of arrows (FIG. 13A), the lens holder 2 is moved upward in the focusing direction according to Fleming's left-hand rule.

However, as a result of the movement in the focusing direction, the balance of the direction of the electric current in the focusing coil, existing in a magnetic field-existing region (indicated by hatching in FIG. 13B), is lost, and therefore the lens holder 2 is not moved parallel in the focusing direction, but is angularly moved in a counterclockwise direction to be skewed as shown in FIG. 13B. The amount of this skew increases as the amount of movement of the lens holder 2 in the focusing direction and the tracking direction increases. FIG. 14 is a view showing skew developing when the lens holder is moved in the focusing direction and the tracking direction.

The conventional optical pickup apparatus has the above construction, and therefore a tangential skew and a radial skew of the optical disk, which could be ignored in the conventional optical disk, can not be ignored in the recording and reproduction of a high-density optical disk in view of the reliability of a detection signal. For example, in a DVD, a dynamic skew margin is reduced in accordance with a short wavelength of a laser beam and a high NA (numerical aperture) of an optical system, and therefore a spindle motor for rotating the optical disk is skewed, or the skew is effected using a support shaft, supporting an optical pickup, and a guide shaft, and this adjustment margin prevents the achievement of the thin design. Non-standard optical disks have now been extensively marketed by various makers, and it has now become difficult to properly meet these various optical disks.

SUMMARY OF THE INVENTION

It is an object of this invention to provide an optical pickup apparatus in which there is provided simple drive means for controlling tilt of an objective lens relative to an optical disk, and the tilt control of an optical pickup is effected so that the optical axis of the objective lens can be kept perpendicular to a recording surface of the optical disk.

According to the present invention, there is provided an optical pickup apparatus comprising:

lens holding means holding an objective lens;

lens drive means for driving the lens holding means in a focusing direction and a tracking direction;

elastic support members fixedly secured at one ends thereof to the lens holding means to support the lens holding means in a manner to allow movement of the lens holding means; and a support fixing member supporting and fixing the elastic support members, the other ends of the elastic support members being fixedly secured to the support fixing member;

wherein the lens drive means is disposed between the lens holding means and the support fixing member; and wherein second lens drive means for driving the lens holding means in a direction inclined relative to the focusing direction or the tracking direction is provided between the lens drive means and the support fixing member.

The second lens drive means comprises magnets, mounted on the lens holding means, and coils mounted on the support fixing member.

With this construction, there can be provided the optical pickup apparatus in which the lens holding means can be dynamically tilted so that the optimum signal reading can always be effected, thus achieving the tilt adjustment, and the optical axis of the objective lens can be kept perpendicular to a recording surface of an optical disk.

DESCRIPTION OF THE PREFERRED EMBODIMENTS

First Embodiment

Figure 1:
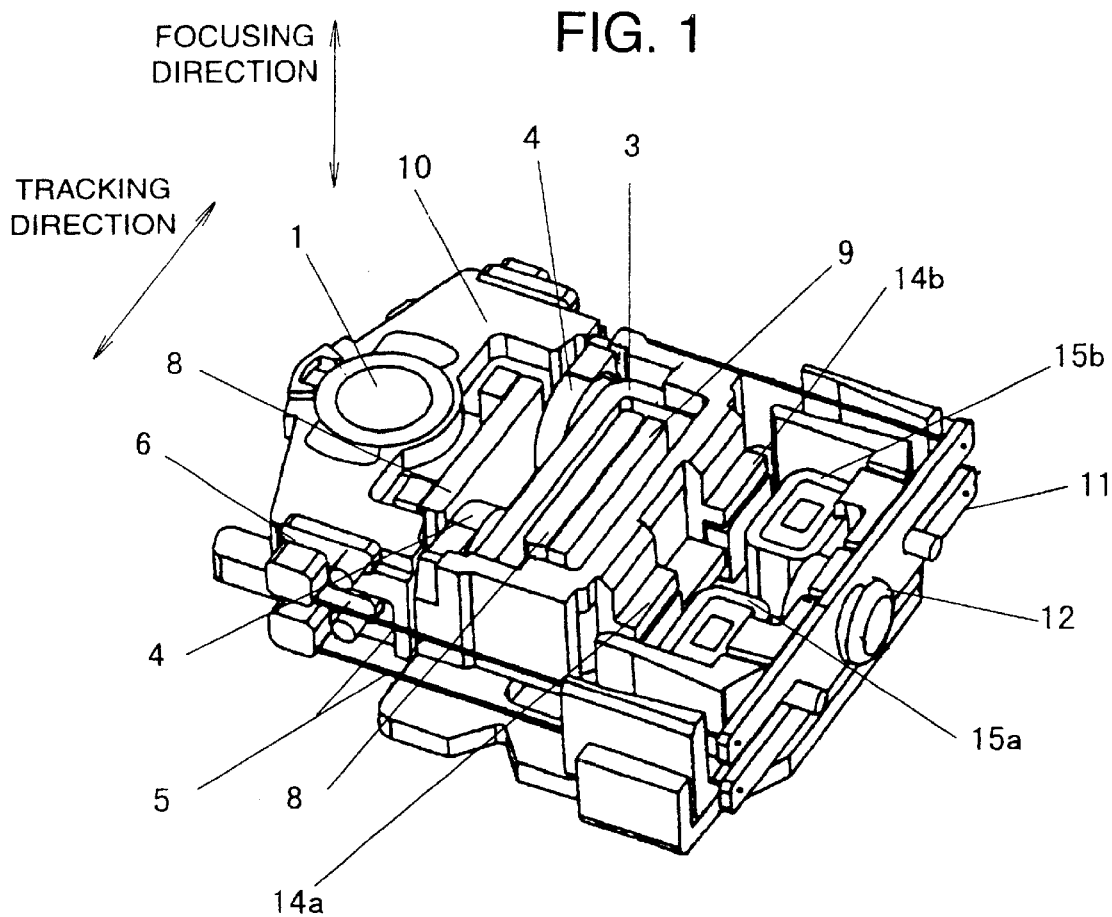
FIG. 1 is a perspective view of a preferred embodiment of an optical pickup apparatus of the invention.

FIG. 1 is a perspective view of a preferred embodiment of an optical pickup apparatus of the invention. As shown in FIG. 1, this optical pickup apparatus comprises an objective lens 1 for converging light onto an optical disk, a lens holder (lens holding means) 10 to which the objective lens 1 is secured by an adhesive or the like, a focusing coil 3 adhesively secured to the lens holder 10 so as to move the lens holder 10 in a focusing direction, tracking coils 4 adhesively secured to the lens holder 10 so as to move the lens holder 10 in a tracking direction, four wires (elastic support members) 5 which serve to feed electric current to the focusing coil 3 and the tracking coils 4, and hold the lens holder 10 in a neutral position, relay boards 6 secured to the lens holder 10 by an adhesive or the like so as to relay the feeding of electric current to the focusing coil 3 and the tracking coils 4 from the wires 5, a board 11 which has the four wires 5 (holding the lens holder 10 in the neutral position) fixedly secured thereto, and is fixedly secured to a suspension base (support fixing member) 13 by a screw 12, and a yoke 9 fixedly secured to the suspension base 13 by an adhesive or screws, and magnets 8 (which cooperates with the focusing coil 3 and the tracking coils 4 to form lens drive means) fixedly secured to the yoke 9 by an adhesive or the like so as to impart a magnetic field to the focusing coil 3 and the tracking coils 4. The optical pickup apparatus of the first embodiment further comprises two tilt magnets 14a and 14b fixedly secured to the lens holder 10 (holding the objective lens 1) by an adhesive, and tilt coils 15a and 15b (which cooperate with the tilt magnets 14a and 14b to form second lens drive means) disposed in opposed relation to the tilt magnets 14a and 14b, respectively.

Figure 2:
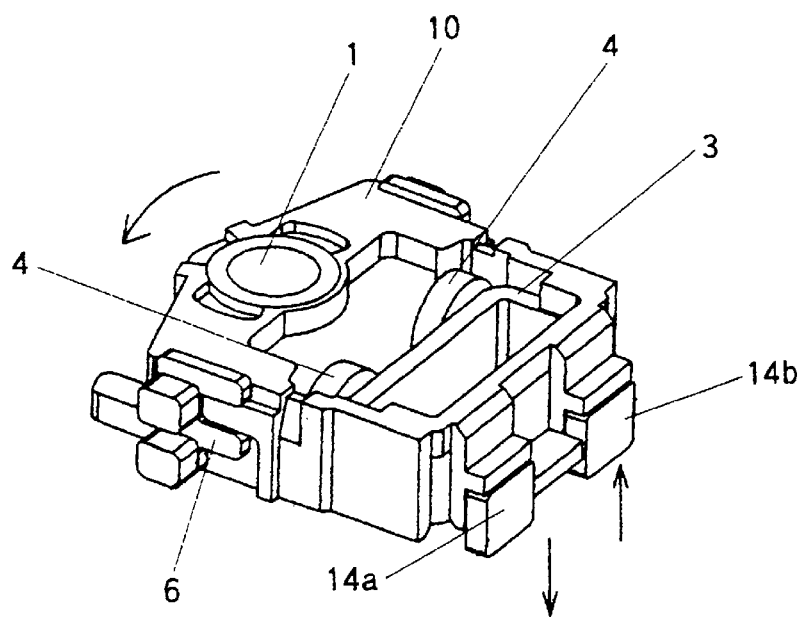
FIG. 2 is a perspective view of a moving portion of the optical pickup apparatus of FIG. 1.
Figure 3:
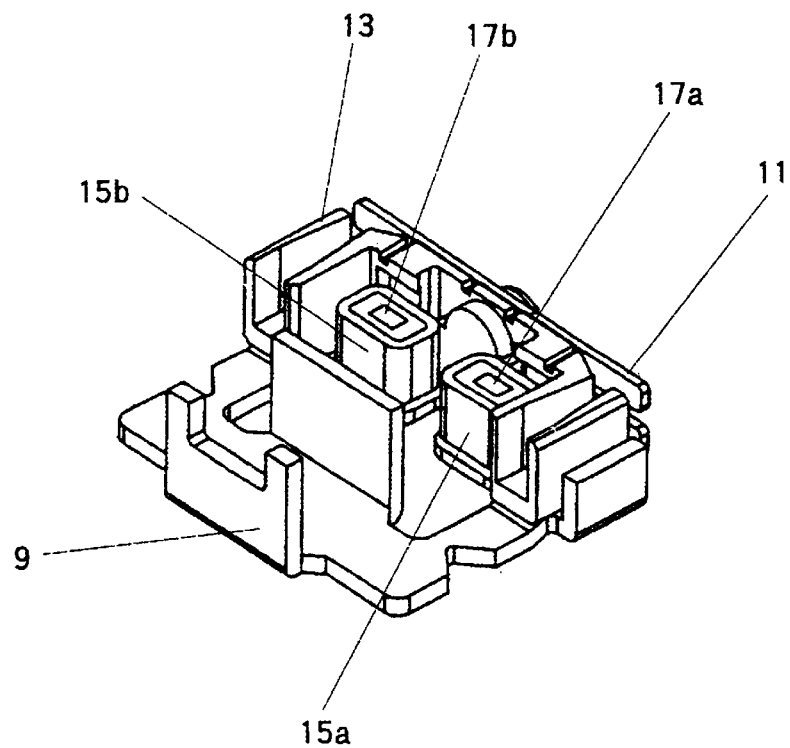
FIG. 3 is a perspective view of a fixed portion of the optical pickup apparatus of FIG. 1.
Figure 4:
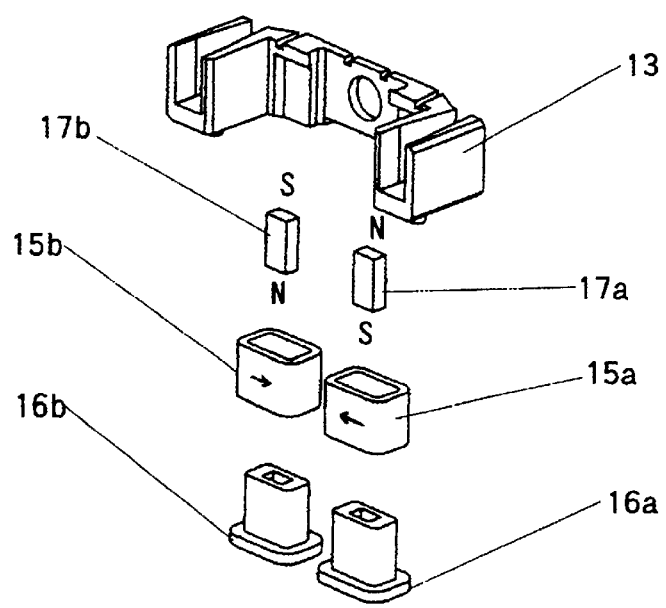
FIG. 4 is an exploded, perspective view of the fixed portion of FIG. 3.

FIG. 2 is a perspective view of a moving portion of the optical pickup apparatus of FIG. 1. FIG. 3 is a perspective view of a fixed portion of the optical pickup apparatus of FIG. 1, and FIG. 4 is an exploded, perspective view of the fixed portion of FIG. 3. In these Figures, the two tilt coils 15a and 15b are wound respectively on tilt coil bobbins 16a and 16b molded of a resin. Iron cores 17a and 17b are fixedly secured respectively to the tilt coil bobbins 16a and 16b by an adhesive or by insert molding (one-piece molding) and these iron cores 17a and 17b form magnetic fields when electric current flows in the tilt coils 15a and 15b. The tilt coil bobbins 16a and 16b are precisely fixed to the suspension base 13.

Next, the driving of the objective lens 1 by the optical pickup apparatus of the first embodiment will be described. First, the lens holder 10 is held in the neutral position by the four wires 5, and electric current is flowed in the focusing coil 3 and the tracking coils 4 through the wires 5, and by changing the magnitude and direction of this electric current, the lens holder 10, having the objective lens 1 mounted thereon, can be moved in the focusing direction and the tracking direction. This operation is the same as the operation of the conventional actuator device.

The optical pickup apparatus of the first embodiment has the function of effecting a tilt control so as to correct a skew angle of the lens holder 10. For example, when electric current is flowed in the tilt coils 15a and 15b in directions indicated in FIG. 4, the iron cores 17a and 17b, provided respectively within the tilt coils 15a and 15b, are magnetized as shown in FIG. 4. Therefore, because of the magnetic attraction and repulsion between the magnetized iron cores 17a and 17b and the tilt magnets 14a and 14b, mounted on the lens holder 10, a force acts on the lens holder 10 as indicated by arrows in FIG. 2 to tilt the lens holder 10 so that a tilt angle due to a warp of the optical disk can be corrected. Naturally, by changing the direction and magnitude of the electric current flowing in the skew coils 15a and 15b, the direction and angle of tilt of the lens holder 10, having the objective lens 1 mounted thereon, can be changed.

Thus, in addition to the coils for effecting the focusing and tracking operation as in the conventional actuator device, the tilt coils 15a and 15b are provided for effecting the tilt operation. Therefore, variations in the driver does not need to be taken into consideration, and besides in the normal operation (in which the tilt operation is not effected), the actuator device operates in the same manner as the conventional actuator device, and therefore various characteristics of the actuator device will not be adversely affected.

Second Embodiment

Figure 5:
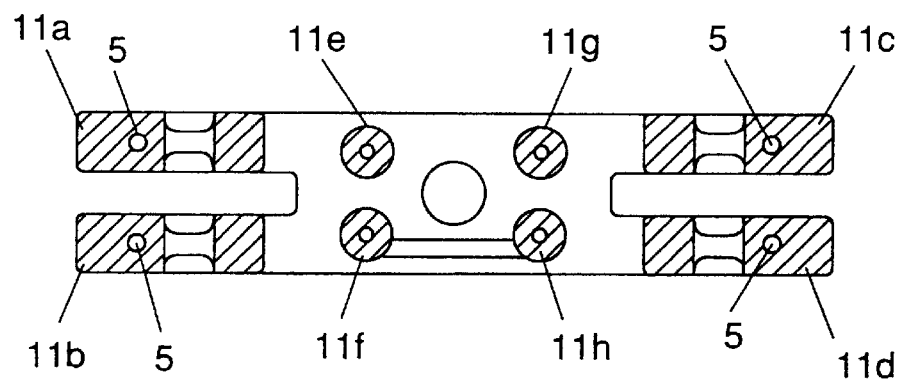
FIG. 5 is a front-elevational view of a board in a second embodiment of the invention.

A second embodiment of an optical pickup apparatus of the invention will be described with reference to FIG. 5. FIG. 5 is a front-elevational view of aboard in the second embodiment. The optical pickup apparatus of the second embodiment is similar in construction to the optical pickup apparatus of the first embodiment, but differs therefrom in the construction of the board 11. Four wires 5 are fixedly secured to the board 11, and the four wires 5 are secured respectively to four end portions 11a, 11b, 11c and 11d of the board 11 by soldering. For effecting a tilt operation, two feeders for feeding electric current to a tilt coil 15a are soldered respectively to intermediate portions 11e and 11f of the board 11, and similarly two feeders for feeding electric current to a tilt coil 15b are soldered respectively to intermediate portions 11g and 11h of the board 11. Electric current is fed from an external flexible cable to feeders which feed electric current to the coils (focusing coil 3, tracking coils 4 and tilt coils 15a and 15b). Thus, the tilt coils 15a and 15b are soldered to the same surface to which the conventional four wires are soldered, and with this construction the efficiency of the soldering operation in the assembling operation is enhanced.

Third Embodiment

Figure 6:
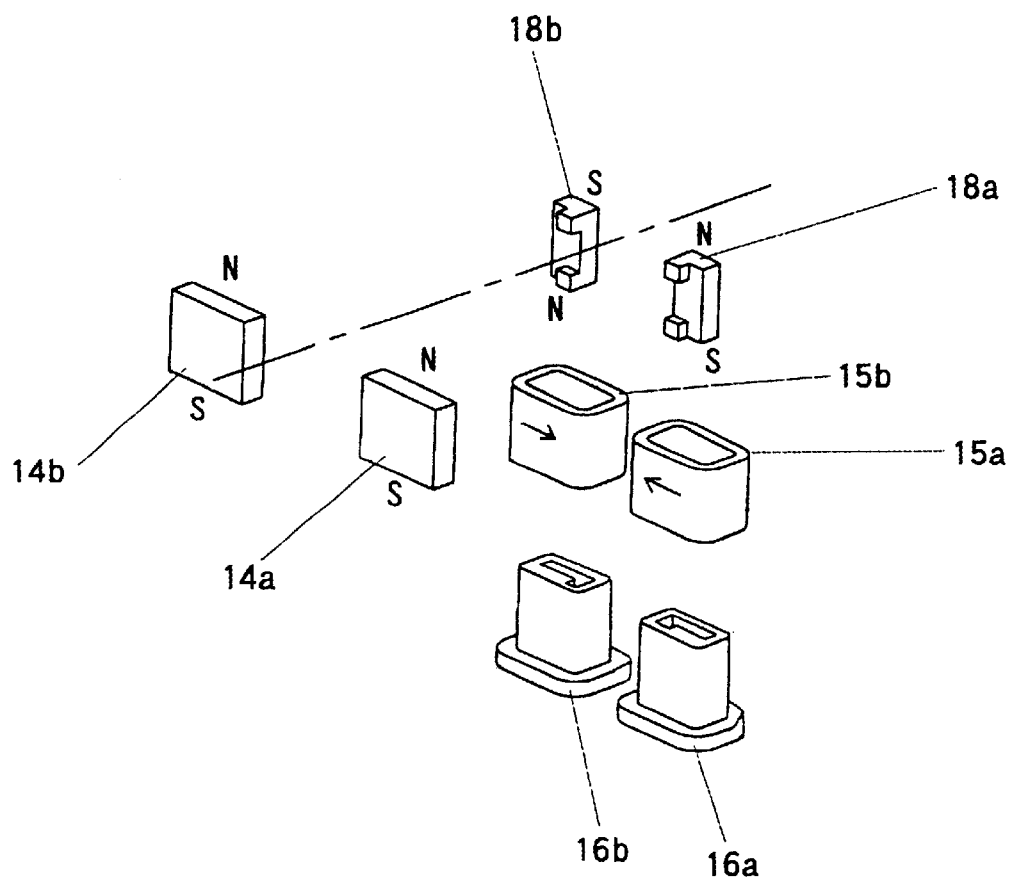
FIG. 6 is an exploded, perspective view of a tilt drive portion in a third embodiment of the invention.

A third embodiment of an optical pickup apparatus of the invention will be described with reference to FIG. 6. FIG. 6 is an exploded, perspective view of a tilt drive portion of the third embodiment, and shows constituent elements of the invention added to the conventional actuator device. In the optical pickup apparatus of the third embodiment, the iron cores 17a and 17b, provided for effecting the tilt operation, are so configured as to suppress a skew developing during the focusing operation and the tracking operation.

In the optical pickup apparatus of the third embodiment, iron cores 18a and 18b (corresponding respectively to the iron cores 17a and 17b in FIG. 4) have such a configuration that upper and lower portions of each iron core 18a, 18b has a generally L-shaped cross-section, and a projection of this L-shape is removed at an intermediate portion thereof.

Figure 7A:
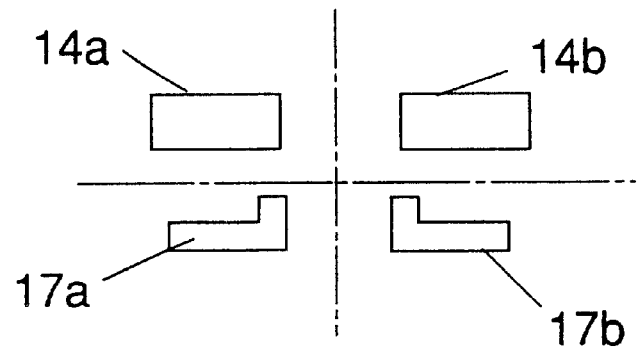
FIG. 7A is an enlarged plan view of a magnetic circuit portion of FIG. 6.
Figure 7B:
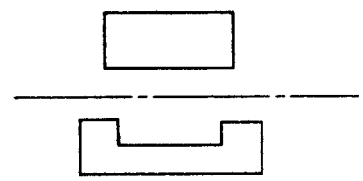
FIG. 7B is an enlarged side-elevational view of the magnetic circuit portion of FIG. 6.
Figure 7C:
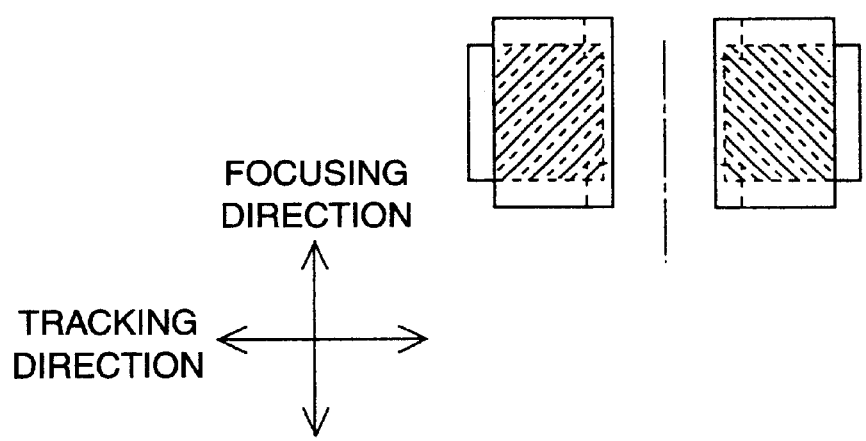
FIG. 7C is an enlarged front-elevational view of the magnetic circuit portion of FIG. 6.

Next, the behavior of a lens holder 10 will be described with reference to FIGS. 7A to 9F. FIGS. 7A to 7C are enlarged views of a magnetic circuit portion, and show only tilt magnets 14a and 14b and the iron cores 18a and 18b. Since the movement of the lens holder 10 is the same as the movement of the tilt magnets 14a and 14b, the showing of the lens holder is omitted. As shown in FIG. 7, the direction of upward and downward movement of the lens holder 10 is the focusing direction whereas the direction of right and left movement of the lens holder 10 is the tracking direction.

Figure 8A:
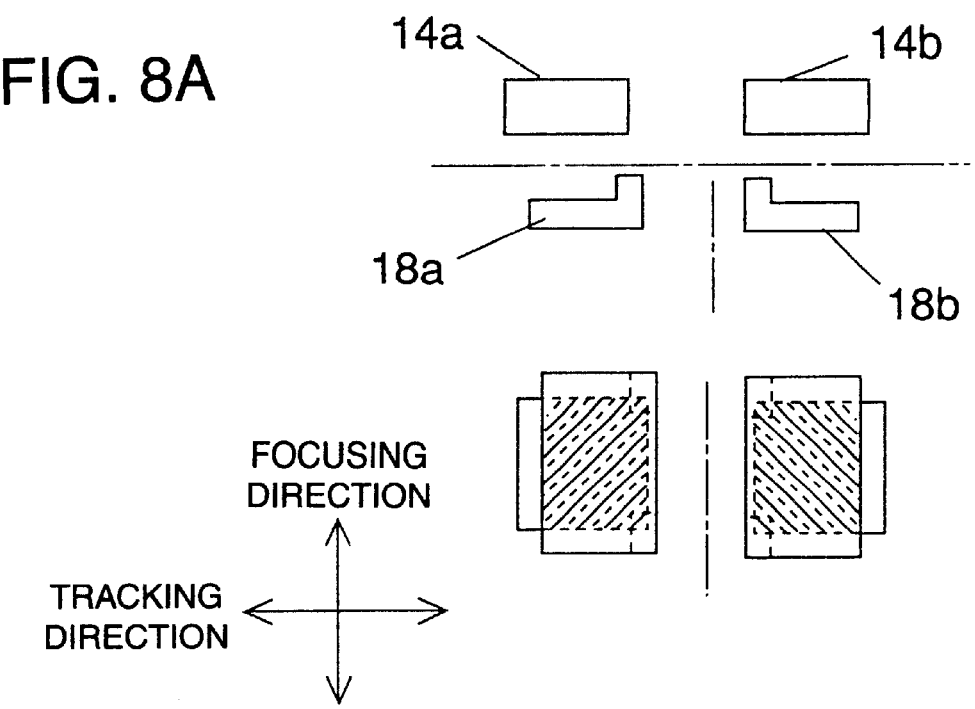
FIGS. 8A and 8B are views explanatory of a tracking operation in FIG. 7.
Figure 8B:
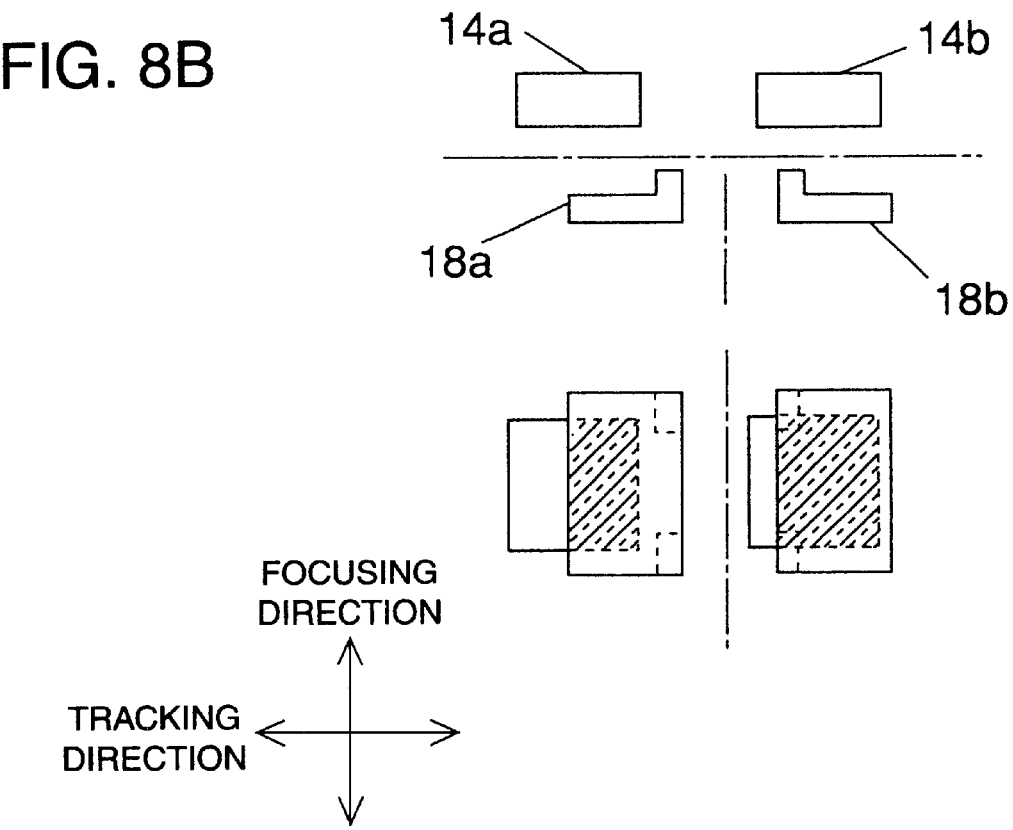

FIGS. 8A and 8B are views explanatory of the tracking operation of FIGS. 7A to 7C. FIG. 8A shows an initial condition, and electric current is not flowed in a focusing coil 3 and tracking coils 4, and the lens holder 10 is disposed in a neutral position. Then, electric current is flowed in the tracking coils 4, so that the lens holder 10 (and hence the tilt magnets 14a and 14b) are moved in the tracking direction as shown in FIG. 8B.

Figure 9A:
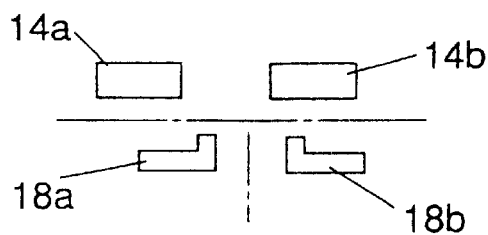
FIGS. 9A, 9C and 9E are plan views explanatory of the focusing-tracking operation in FIG. 7.
Figure 9B:
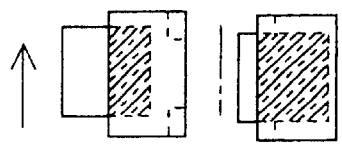
FIGS. 9B, 9D and 9F are front-elevational views explanatory of the focusing-tracking operation in FIG. 7.
Figure 9C:
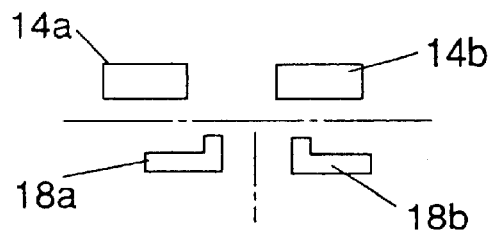
Figure 9D:
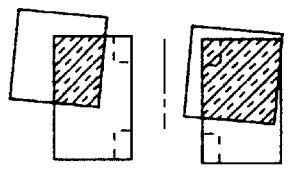

FIGS. 9A to 9F are views explanatory of the focusing-tracking operation of FIGS. 7A to 7C. In FIGS. 9A and 9B, electric current is flowed in the focusing coil 3 so that the lens holder 10 can be moved in the upward focusing direction (see FIGS. 7A to 7C) from the condition of FIG. 8B. The condition of the lens holder 10, obtained when flowing this electric current, is shown in FIGS. 9C and 9D. In these Figures, the tilt magnets 14a and 14b are attracted by the iron cores 18a and 18b, respectively. If the degree of attraction of the tilt magnet 14a is equal to that of the tilt magnet 14b, the lens holder 10 is moved in the focusing direction while kept in a horizontal condition. However, when the lens holder 10 is moved in the tracking direction as shown in FIGS. 9A and 9B, the degree of attraction of the left tilt magnet 14a becomes different from the degree of attraction of the right tilt magnet 14b. Those portions, indicated by hatching in FIG. 9B, represent regions where the tilt magnets 14a and 14b are liable to be attracted by the iron cores, respectively, and it will be appreciated from FIG. 9B that the attraction of the right tilt magnet is higher than that of the left tilt magnet. Namely, the fact that the attraction of the right tilt magnet is higher means that the right side portion of the lens holder 10 is less moved than the left side portion when the lens holder 10 is moved in the focusing direction. Therefore, the lens holder 10 is tilted as shown in FIG. 9D.

Figure 13A:
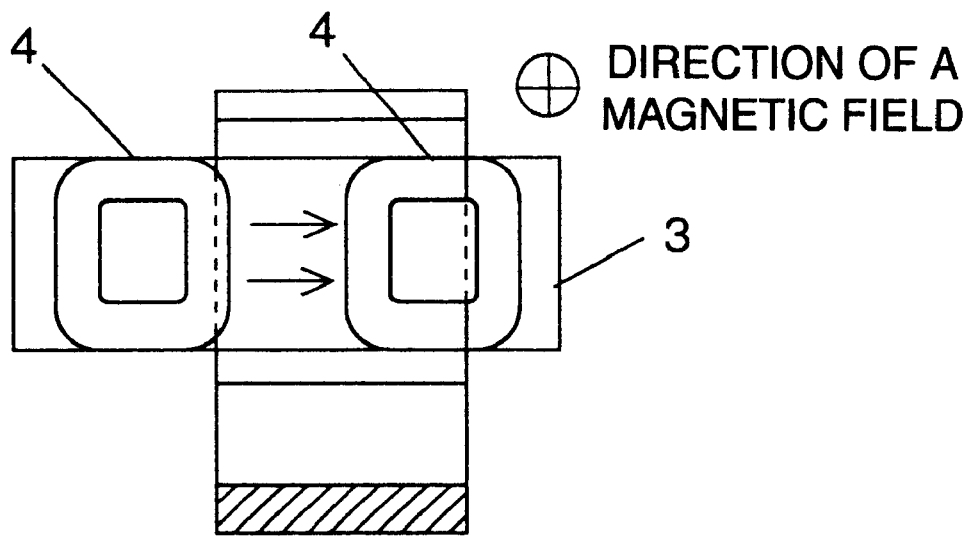
FIGS. 13A and 13B are cross-sectional views taken along the line A—A of FIG. 11A, showing a focusing-tracking operation.
Figure 13B:
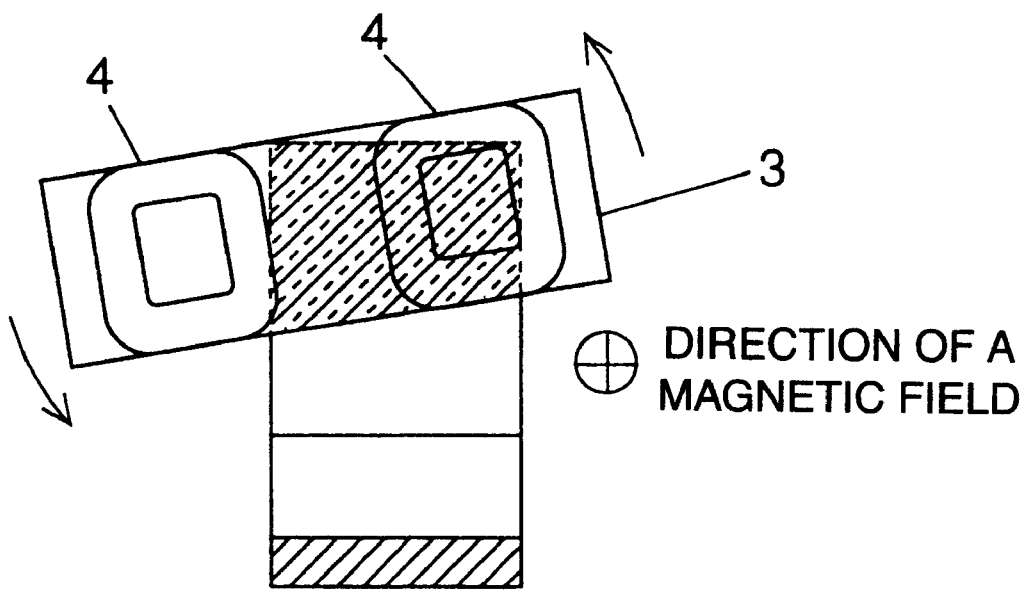
Figure 14:
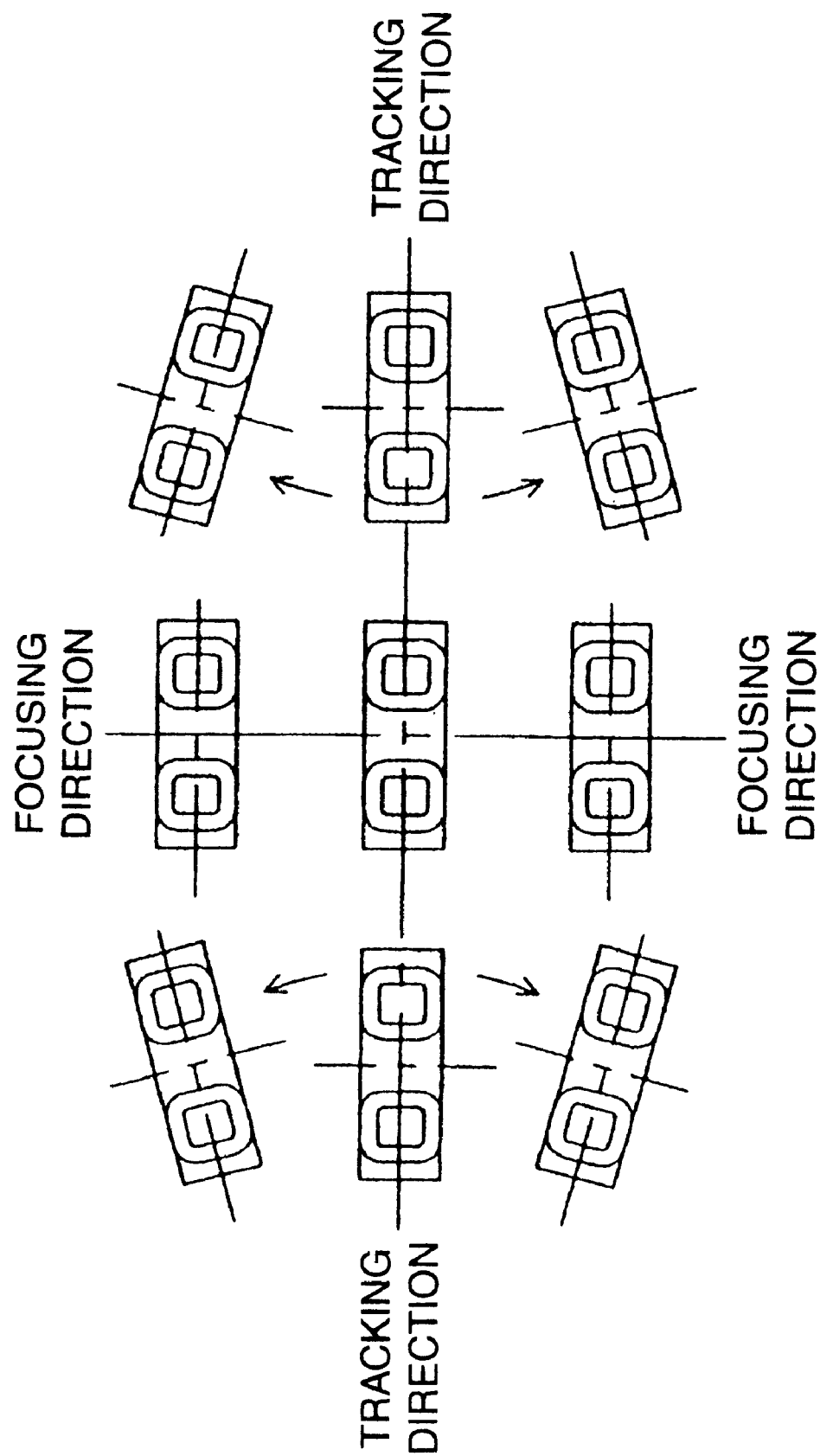
FIG. 14 is a view explaining a tilt of the optical pickup apparatus of FIG. 10 shown in FIGS. 13A and 13B.

This tilt occurs in a direction to cancel a skew tilt of the lens holder 10 which has been a problem with the behavior of the conventional actuator device (see FIG. 13B), and by suitably determining the configuration of the iron cores 18a and 18b (iron cores 17a and 17b in FIG. 4) employed in the first embodiment, a skew (which has been a problem with the conventional actuator device) can be reduced. Such a skew increases as the amount of movement in the focusing direction increases, and in order that even this increase portion can be canceled, the projection is formed on one side portion of each of the upper and lower end portions of each iron core 18a, 18b, so that these upper and lower end portion have a generally L-shaped cross-section, and the intermediate portion of each iron core 18a, 18b has a rectangular cross-section.

Figure 9E:
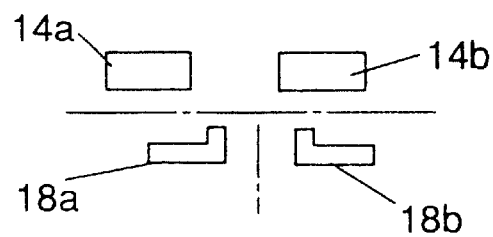
Figure 9F:
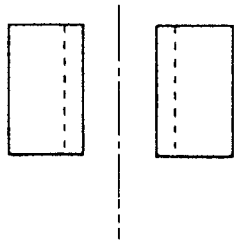
Figure 10:
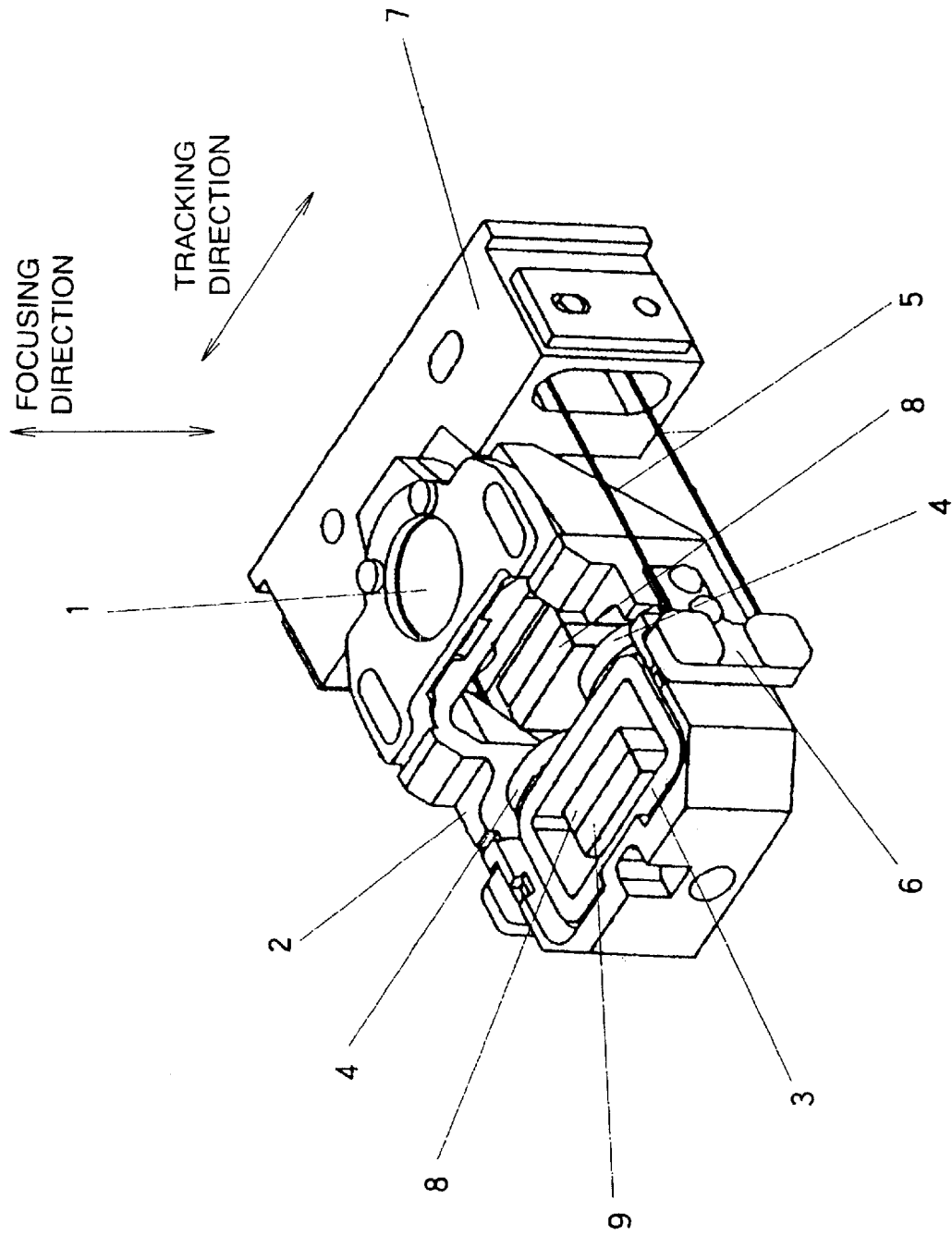
FIG. 10 is a perspective view of a conventional optical pickup apparatus.
Figure 11A:
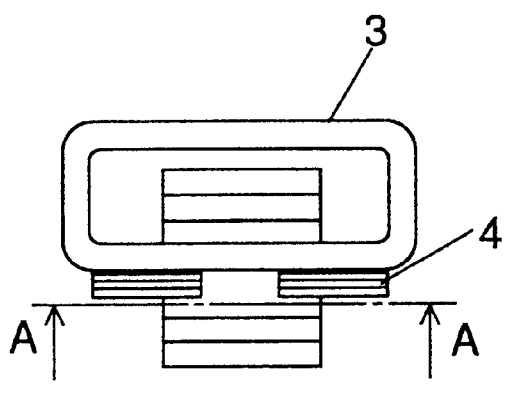
FIG. 11A is an enlarged plan view of a magnetic circuit portion of FIG. 10.
Figure 11B:
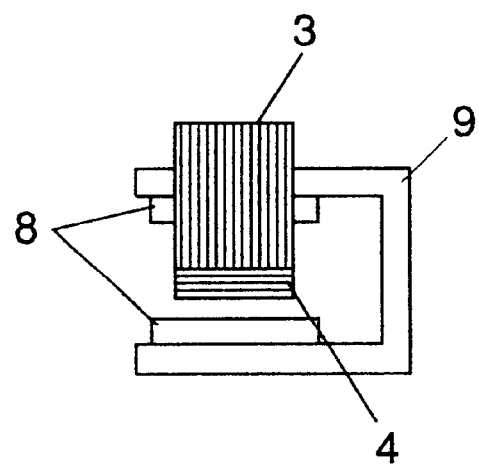
FIG. 11B is an enlarged side-elevational view of the magnetic circuit portion of FIG. 10.
Figure 11C:
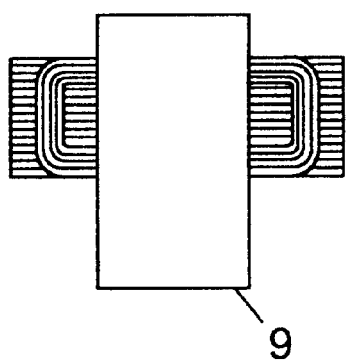
FIG. 11C is an enlarged front-elevational view of the magnetic circuit portion of FIG. 10.
Figure 11D:
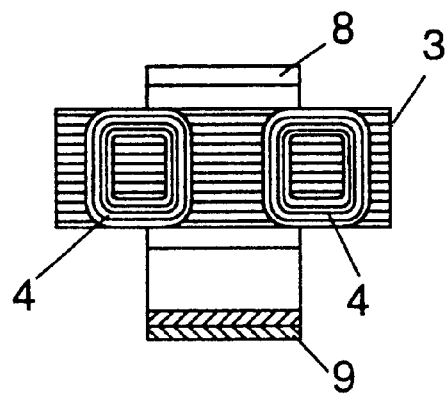
FIG. 11D is a cross-sectional view taken along the line A—A of FIG. 11A.
Figure 12A:
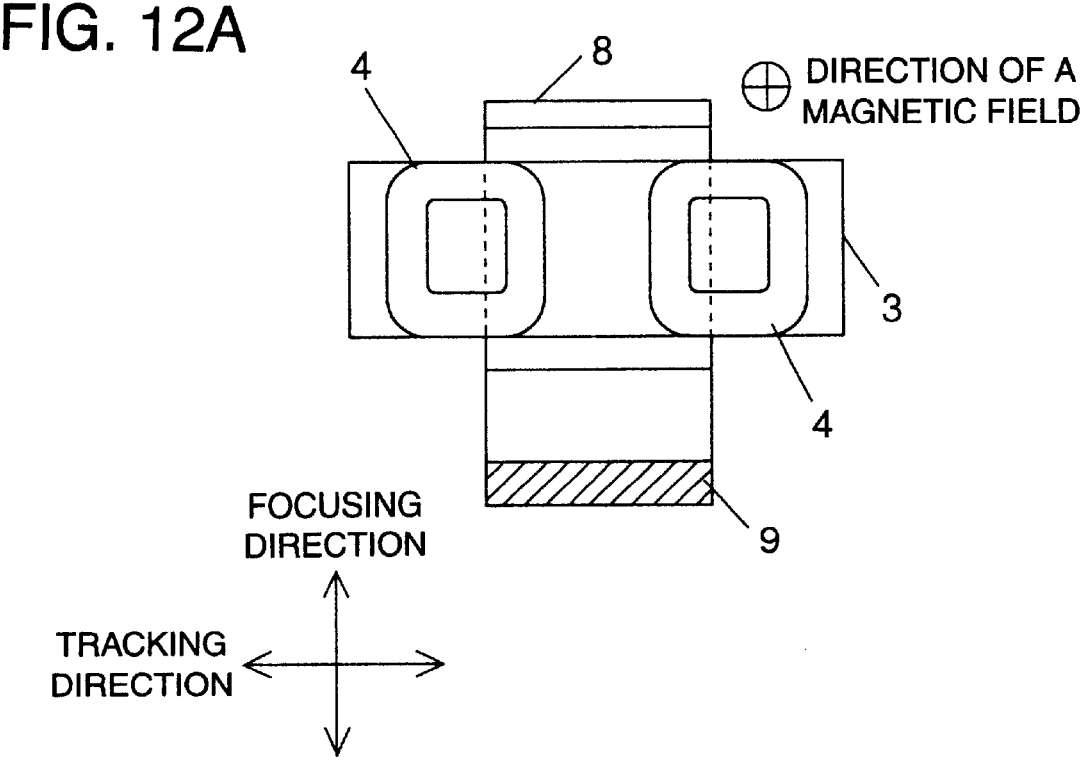
FIGS. 12A and 12B are cross-sectional views taken along the line A—A of FIG. 11A, showing a tracking operation.
Figure 12B:
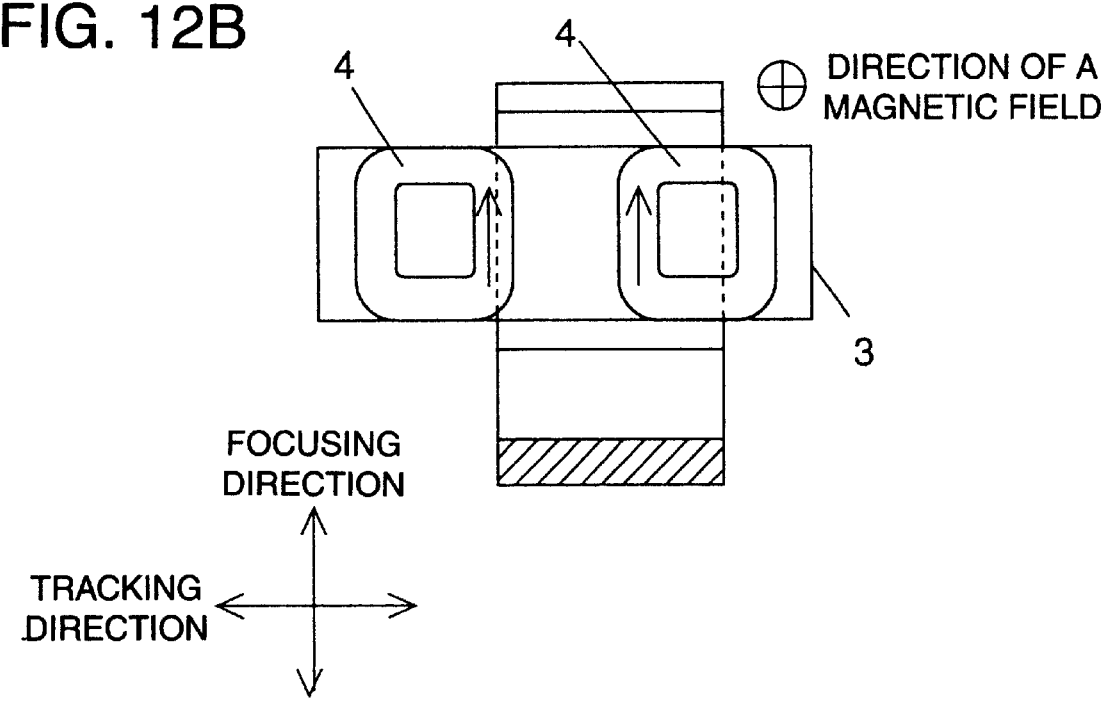

FIGS. 9E and 9F show a modified configuration in which a projection is formed on each iron core 18a, 18b, and extends continuously from its upper end to the lower end, so that the iron core has a generally L-shaped cross-section. With this configuration, similar effects can be achieved.

Although the embodiments of the invention are directed to the optical pickup apparatus of the moving coil-type in which the coils are mounted on the lens holder, the invention is not limited to such a moving coil-type optical pickup apparatus. For example, even if the magnets are mounted on the lens holder, similar functions can be achieved. In this case, the wiring to the board end portions 11a, 11b, 11c and 11d is omitted. Thus, there can be achieved the optical pickup apparatus which is simple and sturdy in construction.

As described above, in the present invention, a skew angle, developing as a result of a warp of the optical disk, can be corrected, and the tilt control can be effected so that the objective lens can be always disposed in a posture best suited for reading signals, and therefore the ability of reading information from the optical disk is enhanced.

What is claimed is:

1. An optical pickup apparatus comprising:

an objective lens;

lens holding means for holding said objective lens, the lens holding means being formed so as to have a rectangle frame shape;

a first lens drive means including a yoke having a portion inserted into the rectangle frame of said lens holding means, a magnet fixed to said inserted portion, a focusing coil for driving said lens holding means in a focusing direction, and tracking coils for driving said lens holding means in a tracking direction, said focusing coil being so fixed on said lens holding means as to surround said inserted portion and said magnet, said tracking coils being fixed to a position facing said magnet on said lens holding means;.

elastic support members fixedly secured at one of the ends thereof to said lens holding means to support said lens holding means in a manner to allow movement of said lens holding means and feeding electric current to said focusing coil and said tracking coils;

a support fixing member supporting and fixing said elastic support members, the other ends of said elastic support members being fixedly secured to the support fixing member, the support fixing member being supported by said yoke; and a second lens drive means including two tilt magnets which are disposed on a surface of said lens holding means facing said support fixing member and are arranged along the tracking direction, two iron cores fixed on a surface of said support fixing member facing said lens holding means and tilt coils which are mounted on said iron cores and are so arranged as to face said tilt magnets, wherein:

said second lens drive means is driven independently of said first lens drive means and drives said lens holding means in a direction inclined relative to said focusing direction or said tracking direction, and said iron cores are provided with projections on each of upper and lower sides in the focusing direction so that upper and lower portions of the iron cores have a generally L-shaped cross-section.

2. An optical pickup apparatus wherein a lens holder, for holding an objective lens, is supported through suspension springs, and a focusing coil and tracking coils, mounted on said lens holder, are for being disposed in a magnetic field so that said lens holder is moved in a focusing direction and a tracking direction, wherein magnets are mounted on said lens holder, and second coils are provided in opposed relation to said magnets, respectively, and said magnets and said second coils are operable to cooperate with each other to tilt said objective lens, and an iron core is provided within each of said second coils, and said iron core has a projection projecting toward the associated magnet.

3. An optical pickup apparatus, comprising:

an objective lens;

a lens holder that holds the objective lens;

a focusing and tracking position (FTP) driver that moves the lens holder along a focusing direction axis and a tracking direction axis, using FTP electromotive forces, the FTP driver having an FTP magnet, an FTP yoke, a first FTP coil wound around the FTP yoke, and a second FTP coil that cooperate to produce the FTP electromotive forces; and a tilt position (TP) driver that moves the lens holder in a tilt direction, using a TP electromotive force, the TP driver having a TP magnet, a TP coil, and a TP core that cooperate to produce the TP electromotive force, wherein:

the TP magnet, TP coil, and TP core cooperate independently of the FTP magnet, FTP yoke, and first and second FTP coils to produce the TP electromotive force, and the TP core is a magnetic material that is contoured to vary the TP electromotive force applied to a particular area of the lens holder in accordance with the position of the TP core relative to the TP magnet.

4. The optical pickup apparatus of claim 3, wherein a movement of the lens holder by the FTP driver along the tracking direction axis induces a relative positional change between the TP core and TP magnet.

5. An optical pickup apparatus, comprising:

an objective lens;

a lens holder that holds the objective lens;

a focusing and tracking position (FTP) driver that moves the lens holder along a focusing direction axis and a tracking direction axis, using FTP electromotive forces, the FTP driver having an FTP magnet, an FTP yoke, a first FTP coil wound around the FTP yoke, and a second FTP coil that cooperate to produce the FTP electromotive forces; and a tilt position (TP) driver that moves the lens holder in a tilt direction, using TP electromotive forces, the TP driver having a first TP magnet, a first TP coil, and a first TP core that cooperate to produce a first TP electromotive force of the TP electromotive forces and having a second TP magnet, a second TP coil, and a second TP core that cooperate to produce a second TP electromotive force of the TP electromotive forces, wherein:

the first TP magnet, first TP coil, and first TP core cooperate to produce the first TP electromotive force independently of the second TP magnet, second TP coil, and second TP core, the FTP magnet, FTP yoke, and first and second FTP coils cooperate to produce the FTP electromotive forces independently of the first and second TP magnets, first and second TP coils, and first and second TP cores, and the first and second TP cores are each a magnetic material that is contoured to vary the TP electromotive force applied to a particular area of the lens holder in accordance with the position of the respective TP core relative to the corresponding TP magnet.

6. The optical pickup apparatus of claim 5, wherein a movement of the lens holder by the FTP driver along the tracking direction axis induces a positional change of each of the first and second TP cores relative to the corresponding TP magnet.

7. An optical pickup apparatus, comprising:

lens holding means, including a lens holder, for holding an objective lens;

first lens drive means for driving said lens holding means in a focusing direction and a tracking direction;

a second lens drive means, including tilt magnets and tilt coils, for driving said lens holding means in a direction inclined relative to said focusing direction or said tracking direction;

elastic support members fixedly secured at one of the ends thereof to said lens holding means to support said lens holding means in a manner to allow movement of said lens holding means; and a support fixing member supporting and fixing said elastic support members, the other ends of said elastic support members being fixedly secured to the support fixing member, wherein:

said second lens drive means is disposed between said lens holding means and said support fixing member, said lens holder is supported through suspension springs, and a focusing coil and tracking coils, mounted on said lens holder, are disposed in a magnetic field so that said lens holder is moved in said focusing direction and said tracking direction, said tilt magnets, included in said second lens drive means, are mounted on said lens holder and said tilt coils, included in said second lens drive means, are provided in opposed relation to said tilt magnets, respectively, and said tilt magnets and tilt coils cooperate with each other to tilt said objective lens, and an iron core is provided within each of said tilt coils, and said iron core has a projection projecting toward an associated one of said tilt magnets.

* * * * *